(12) United States Patent
Onodera et al.

(10) Patent No.: US 11,924,652 B2
(45) Date of Patent: Mar. 5, 2024

(54) CONTROL DEVICE AND CONTROL METHOD

(71) Applicant: HONDA MOTOR CO., LTD., Tokyo (JP)

(72) Inventors: Satoshi Onodera, Tokyo (JP); Masamitsu Tsuchiya, Wako (JP); Hideki Matsunaga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 131 days.

(21) Appl. No.: 17/483,884

(22) Filed: Sep. 24, 2021

(65) Prior Publication Data

US 2022/0014941 A1 Jan. 13, 2022

Related U.S. Application Data (63) Continuation of application No. PCT/JP2019/014302, filed on Mar. 29, 2019.

(51) Int. Cl.
*H04W 24/02* (2009.01)
*G05D 1/00* (2006.01)

(52) U.S. Cl.
CPC .......... *H04W 24/02* (2013.01); *G05D 1/0022* (2013.01)

(58) Field of Classification Search
CPC ..... H04W 4/029; H04W 4/024; H04W 4/025; H04W 72/54; H04W 36/245; G05D 1/0022
See application file for complete search history.

(56) References Cited

U.S. PATENT DOCUMENTS

| | | | | |
|---|---|---|---|---|
| 8,311,741 B1* | 11/2012 | Lawther | ........... | G08G 1/096811 |
| | | | | 701/527 |
| 8,787,917 B1* | 7/2014 | Barrett | ............... | G01C 21/3461 |
| | | | | 455/445 |
| 9,175,969 B2* | 11/2015 | Xie | .......................... | H04W 4/02 |
| 9,557,183 B1* | 1/2017 | Ross | ...................... | G06Q 50/30 |
| 9,853,910 B2 | 12/2017 | Hayama | | |
| 10,331,141 B2* | 6/2019 | Grimm | ................ | G06Q 10/047 |
| 10,520,324 B2 | 12/2019 | Iwai et al. | | |

(Continued)

FOREIGN PATENT DOCUMENTS

| | | | |
|---|---|---|---|
| CN | 107430817 A | | 12/2017 |
| CN | 210439751 U | * | 5/2020 |

(Continued)

OTHER PUBLICATIONS

Japanese Office Action for Japanese Patent Application No. 2021-511747 dated Jan. 6, 2023 (partially translated).

(Continued)

*Primary Examiner* — Matthew C Sams
(74) *Attorney, Agent, or Firm* — Thomas| Horstemeyer, LLP (57) ABSTRACT

A control device of a mobile object is configured to execute a function using communication. The control device includes an acquisition unit configured to acquire communication quality on a planned movement route of the mobile object, and a determination unit configured to determine, based on the acquired communication quality, whether or not the planned movement route includes a position that does not satisfy communication quality required for execution of the function.

5 Claims, 6 Drawing Sheets

(56) References Cited

U.S. PATENT DOCUMENTS

| | | | |
|---|---|---|---|
| 11,561,107 B2* | 1/2023 | Magzimof | H04W 8/08 |
| 2013/0035111 A1* | 2/2013 | Moeglein | H04W 4/029 |
| | | | 455/456.1 |
| 2015/0056973 A1* | 2/2015 | Efrati | H04W 76/34 |
| | | | 455/418 |
| 2016/0248704 A1* | 8/2016 | Soelberg | H04L 67/30 |
| 2017/0019346 A1 | 1/2017 | Hayama | |
| 2017/0061655 A1* | 3/2017 | Pylappan | G06T 11/00 |
| 2018/0004211 A1* | 1/2018 | Grimm | G06Q 10/047 |
| 2018/0023966 A1 | 1/2018 | Iwai et al. | |
| 2018/0023968 A1* | 1/2018 | Stuchfield | G08G 1/096844 |
| | | | 701/416 |
| 2018/0038701 A1 | 2/2018 | Iwai et al. | |
| 2019/0364492 A1* | 11/2019 | Azizi | H04W 92/045 |
| 2020/0057436 A1 | 2/2020 | Boda et al. | |
| 2020/0068584 A1 | 2/2020 | Matsuki et al. | |
| 2020/0112907 A1* | 4/2020 | Dao | H04M 15/8016 |
| 2020/0120458 A1* | 4/2020 | Aldana | H04W 72/23 |
| 2021/0092584 A1* | 3/2021 | Zou | H04W 4/029 |

FOREIGN PATENT DOCUMENTS

| | | |
|---|---|---|
| JP | 2013-115803 A | 6/2013 |
| JP | 2017-050797 A | 3/2017 |
| WO | 2015/119141 A1 | 8/2015 |
| WO | 2018/087879 A1 | 5/2018 |
| WO | 2018/105576 A1 | 6/2018 |
| WO | WO-2018105576 A1 * | 6/2018 ........... B64C 39/024 |
| WO | 2020/202373 A1 | 10/2020 |

OTHER PUBLICATIONS

International Search Report and Written Opinion for PCT/JP2019/014302 dated Jun. 25, 2019.

Chinese Office Action for Chinese Patent Application No. 201980094019.8 dated Feb. 23, 2023.

* cited by examiner

| FUNCTION | REQUIRED QUALITY | ESSENTIAL DATA ITEM | AUXILIARY DATA ITEM |
|---|---|---|---|
| REMOTE DRIVING FUNCTION (HIGHWAY · LEADING MODE) | HIGH QUALITY | SELF-VEHICLE, FRONT, OPERATION INSTRUCTION | SIDE, BEHIND, INFRASTRUCTURE |
| REMOTE DRIVING FUNCTION (GENERAL ROAD · LEADING MODE) | HIGH QUALITY | SELF-VEHICLE, ALL DIRECTIONS, OPERATION INSTRUCTION | INFRASTRUCTURE |
| REMOTE DRIVING FUNCTION (HIGHWAY · ASSISTING MODE) | MEDIUM QUALITY | SELF-VEHICLE, FRONT, OPERATION INSTRUCTION | SIDE, BEHIND, INFRASTRUCTURE |
| REMOTE DRIVING FUNCTION (GENERAL ROAD · ASSISTING MODE) | MEDIUM QUALITY | SELF-VEHICLE, ALL DIRECTIONS, OPERATION INSTRUCTION | INFRASTRUCTURE |
| AUTOMATED DRIVING FUNCTION | NONE | NONE | INFRASTRUCTURE |
| IVI FUNCTION | LOW QUALITY | VIDEO, MUSIC | NONE |
| MANUAL DRIVING FUNCTION | NONE | NONE | INFRASTRUCTURE |

…

CONTROL DEVICE AND CONTROL METHOD

CROSS-REFERENCE TO RELATED APPLICATION(S)

This application is a continuation of International Patent Application No. PCT/JP2019/014302 filed on Mar. 29, 2019, the entire disclosures of which is incorporated herein by reference.

BACKGROUND OF THE INVENTION

Field of the Invention

The present disclosure relates to a control device and a control method.

Description of the Related Art

There is known a remote driving technology in which an operator located at a remote place operates a vehicle. In remote driving, one of required elements is that a communication delay between an operator device for an operator who performs remote driving and a user terminal mounted on a vehicle is sufficiently suppressed. In Japanese Patent Laid-Open No. 2013-115803, the amount of communication is reduced by transmitting difference information of three-dimensional map data of an environment around a vehicle.

SUMMARY OF THE INVENTION

Even in a case where the amount of communication between a vehicle and a remote driving device is reduced, the quality of communication between these devices may be deteriorated due to other causes (for example, convergence of a communication system). Depending on the communication quality, the vehicle cannot satisfactorily execute a remote driving function and other functions. The same applies not only to the vehicle but also to other mobile objects. Some aspects of the present disclosure provide a technology for enabling determination of whether or not a function can be executed on a planned route on which a mobile object is to move.

In an embodiment, provided is a control device of a mobile object configured to execute a function using communication, the control device comprising: an acquisition unit configured to acquire communication quality on a planned movement route of the mobile object; and a determination unit configured to determine, based on the acquired communication quality, whether or not the planned movement route includes a position that does not satisfy communication quality required for execution of the function.

BRIEF DESCRIPTION OF THE DRAWINGS

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

Figure 1:
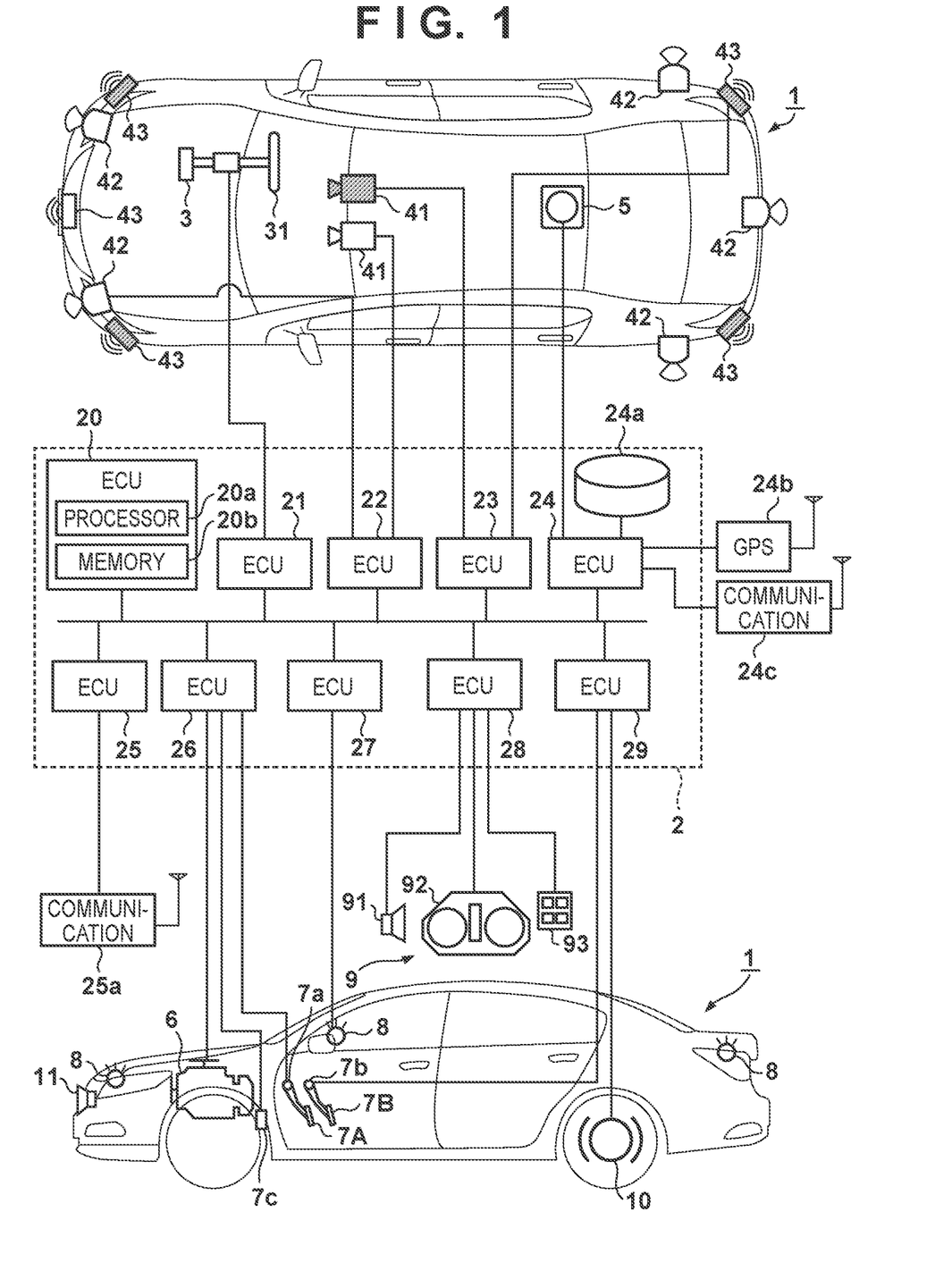
FIG. 1 is a block diagram for describing an example of a configuration of a vehicle according to an embodiment.

A vehicle 1 includes a vehicle control device 2 (hereinafter, simply referred to as a control device 2) that controls the vehicle 1. The control device 2 includes a plurality of electronic control units (ECUs) 20 to 29 communicably connected by an in-vehicle network. Each ECU includes a processor represented by a central processing unit (CPU), a memory such as a semiconductor memory, an interface with an external device, and the like. The memory stores programs executed by the processor, data used for processing by the processor, and the like. Each ECU may include a plurality of processors, memories, interfaces, and the like. For example, the ECU 20 includes a processor 20a and a memory 20b. Processing by the ECU 20 is executed by the processor 20a executing a command included in the program stored in the memory 20b. Alternatively, the ECU 20 may include a dedicated integrated circuit such as an application-specific integrated circuit (ASIC) for executing processing by the ECU 20. The same applies to other ECUs.

Hereinafter, functions and the like assigned to each of the ECUs 20 to 29 will be described. Note that the number of ECUs and the functions assigned to the ECUs can be designed as appropriate and can be subdivided or integrated as compared with the present embodiment.

The ECU 20 performs a traveling control related to an automated driving function and a remote driving function of the vehicle 1. In the traveling control, the ECU 20 automatically controls steering and/or acceleration/deceleration of the vehicle 1. The automated driving function is a function in which the ECU 20 plans a travel route of the vehicle 1 and controls steering and/or acceleration/deceleration of the vehicle 1 based on the travel route. The remote driving function is a function in which the ECU 20 controls steering and/or acceleration/deceleration of the vehicle 1 in accordance with an instruction from an operator outside the vehicle 1. The operator outside the vehicle 1 may be a person or artificial intelligence (AI). The ECU 20 can also execute the automated driving function and the remote driving function in combination. For example, the ECU 20 may perform the traveling control by planning the travel route while there is no instruction from the operator, and when there is an instruction from the operator, the ECU 20 may perform the traveling control according to the instruction.

The ECU 21 controls an electric power steering device 3. The electric power steering device 3 includes a mechanism that steers a front wheel according to a driver's driving operation (steering operation) on a steering wheel 31. In addition, the electric power steering device 3 includes a motor that exerts a driving force for assisting the steering operation and automatically steering the front wheel, a sensor that detects a steering angle, and the like. When a driving state of the vehicle 1 is an automated driving state, the ECU 21 automatically controls the electric power steering device 3 according to an instruction from the ECU 20 and controls a traveling direction of the vehicle 1.

The ECUs 22 and 23 control detection units 41 to 43 that detect a situation outside the vehicle and execute information processing on a detection result. The detection unit 41 is a camera that captures an image of the front of the vehicle 1 (hereinafter, referred to as a camera 41) and is attached to the vehicle interior side of the windshield at the front of the roof of the vehicle 1 in the present embodiment. By analyzing the image captured by the camera 41, it is possible to extract a contour of an object or extract a division line (white line or the like) of a lane on a road.

The detection unit 42 is a light detection and ranging (lidar) (hereinafter, it may be referred to as a lidar 42), detects an object around the vehicle 1, and measures a distance to the object. In the present embodiment, five lidars 42 are provided, one at each corner portion of a front portion of the vehicle 1, one at the center of a rear portion of the vehicle 1, and one at each side of the rear portion of the vehicle 1. The detection unit 43 is a millimeter-wave radar (hereinafter, it may be referred to as a radar 43), detects an object around the vehicle 1, and measures a distance to the object. In the present embodiment, five radars 43 are provided, one at the center of the front portion of the vehicle 1, one at each corner portion of the front portion of the vehicle 1, and one at each corner portion of the rear portion of the vehicle 1.

The ECU 22 controls one camera 41 and each lidar 42 and executes information processing on the detection result. The ECU 23 controls the other camera 41 and each radar 43 and executes information processing on the detection result. Since two sets of devices for detecting the surrounding situation of the vehicle are provided, the reliability of the detection result can be improved, and since different types of detection units such as a camera, a lidar, and a radar are provided, the surrounding environment of the vehicle can be analyzed in multiple ways.

The ECU 24 controls a gyro sensor 5, a global positioning system (GPS) sensor 24b, and a communication device 24c and executes information processing on a detection result or a communication result. The gyro sensor 5 detects a rotational motion of the vehicle 1. The course of the vehicle 1 can be determined based on the detection result of the gyro sensor 5, the wheel speed, and the like. The GPS sensor 24b detects the current position of the vehicle 1. The communication device 24c performs wireless communication with a server that provides map information and traffic information and acquires these pieces of information. The ECU 24 can access a map information database 24a constructed in the memory, and the ECU 24 searches for a route from the current position to a destination and the like. The ECU 24, the map database 24a, and the GPS sensor 24b constitute a so-called navigation device.

The ECU 25 includes a communication device 25a for vehicle-to-vehicle communication. The communication device 25a performs wireless communication with other surrounding vehicles to exchange information between the vehicles. The communication device 25a is also used for communication with an operator outside the vehicle 1.

The ECU 26 controls a power plant 6. The power plant 6 is a mechanism that outputs a driving force for rotating driving wheels of the vehicle 1 and includes, for example, an engine and a transmission. For example, the ECU 26 controls the output of the engine according to the driving operation (accelerator operation or acceleration operation) of the driver detected by an operation detection sensor 7a provided on an accelerator pedal 7A and switches the gear ratio of the transmission based on information such as a vehicle speed detected by a vehicle speed sensor 7c. When the driving state of the vehicle 1 is the automated driving state, the ECU 26 automatically controls the power plant 6 according to an instruction from the ECU 20 and controls the acceleration and deceleration of the vehicle 1.

The ECU 27 controls lighting devices 8 (lamps such as headlight and taillight) including direction indicators (directional signals). In the example of FIG. 1, the lighting devices 8 are provided at the front portion, door mirrors, and the rear portion of the vehicle 1. The ECU 27 further controls a sound device 11 facing the outside of the vehicle, including a horn. The lighting device 8, the sound device 11, or a combination thereof has a function of providing information to the outside of the vehicle 1.

The ECU 28 controls an input/output device 9. The input/output device 9 outputs information to the driver and receives an input of information from the driver. A sound output device 91 notifies the driver of information by sound. A display device 92 notifies the driver of information by displaying an image. The display device 92 is arranged, for example, in front of a driver's seat and constitutes an instrument panel or the like. Note that, although the sound and the image display have been exemplified here, information notification may also be made by using vibration or light. In addition, information notification may be made by using a combination of some of the sound, image display, vibration, and light. Furthermore, the combination or the notification mode may vary in accordance with the level (for example, the degree of urgency) of information notification of which should be made. An input device 93 is a switch group that is arranged at a position where the driver can operate it and is used to input an instruction to the vehicle 1. The input device 93 may also include a sound input device. The ECU 28 can perform guidance related to the traveling control of the ECU 20. Details of the guidance will be described later. The input device 93 may include a switch used to control an operation of the traveling control performed by the ECU 20. The input device 93 may include a camera for detecting a line-of-sight direction of the driver.

The ECU 29 controls a brake device 10 and a parking brake (not illustrated). The brake device 10 is, for example, a disc brake device, and is provided on each wheel of the vehicle 1 to decelerate or stop the vehicle 1 by applying resistance to the rotation of the wheel. The ECU 29 controls the operation of the brake device 10 according to the driver's driving operation (brake operation) detected by an operation detection sensor 7b provided on a brake pedal 7B, for example. When the driving state of the vehicle 1 is the automated driving state, the ECU 29 automatically controls the brake device 10 according to an instruction from the ECU 20 and controls the deceleration and stop of the vehicle 1. The brake device 10 and the parking brake can also be operated to maintain a stopped state of the vehicle 1. In addition, in a case where the transmission of the power plant 6 includes a parking lock mechanism, the parking lock mechanism can also be operated to maintain the stopped state of the vehicle 1.

A configuration of a remote driving device 200 according to some embodiments of the present disclosure will be described with reference to a block diagram of FIG. 2. The remote driving device 200 is a device for providing a remote driving service to a vehicle having the remote driving function. The remote driving device 200 is located away from the service providing target vehicle.

The remote driving device 200 may be capable of providing the remote driving service in a plurality of operation modes. The plurality of operation modes of the remote driving service may include a leading mode and an assisting mode. The leading mode is an operation mode in which the operator of the remote driving device 200 specifies a control amount (for example, a steering angle, an accelerator pedal position, a brake pedal position, a position of a directional signal lever, or on/off of a light) of the vehicle. The assisting mode is an operation mode in which the vehicle (specifically, the ECU 20) determines a control amount of the vehicle in accordance with a path plan specified by the operator of the remote driving device 200. In the assisting mode, the operator of the remote driving device 200 may generate and specify the path plan by himself/herself, or may specify the path plan by adopting a path plan suggested by the vehicle.

Figure 2:
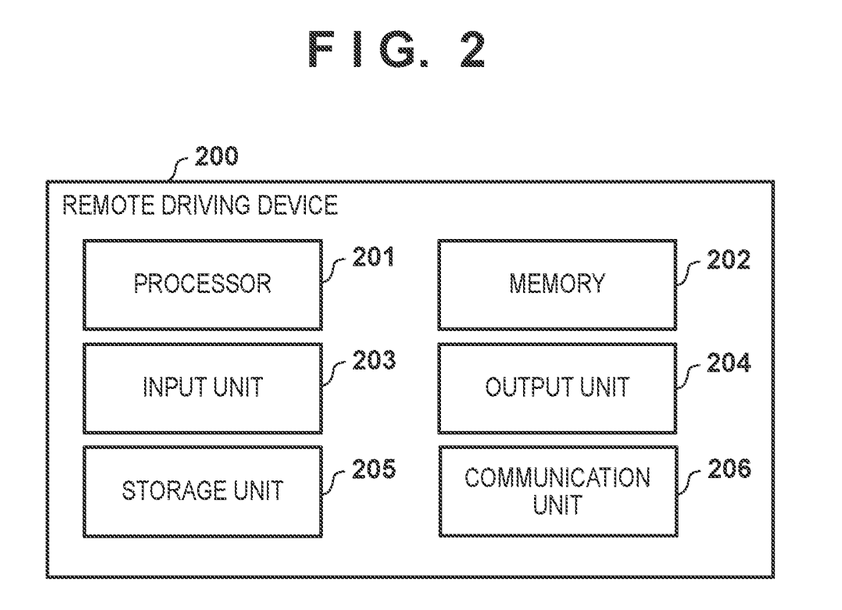
FIG. 2 is a block diagram for describing an example of a configuration of a remote driving device according to the embodiment.

The remote driving device 200 includes each component illustrated in FIG. 2. A processor 201 controls the overall operation of the remote driving device 200. The processor 201 functions as, for example, a CPU. A memory 202 stores programs, temporary data, and the like used for the operation of the remote driving device 200. The memory 202 is implemented by, for example, a ROM or a RAM. An input unit 203 is used by a user of the remote driving device 200 to make an input to the remote driving device 200. The user of the remote driving device 200 is a person who is an operation subject, or is a person (observer) who monitors an operation of AI in a case where the AI is the operation subject. An output unit 204 is used to output information from the remote driving device 200 to the user. A storage unit 205 stores data used for the operation of the remote driving device 200. The storage unit 205 is implemented by a storage device such as a disk drive (for example, HDD or SSD). A communication unit 206 provides a function for the remote driving device 200 to communicate with other devices (for example, a vehicle to be remotely driven), and is implemented by, for example, a network card, an antenna, or the like.

Figure 3:
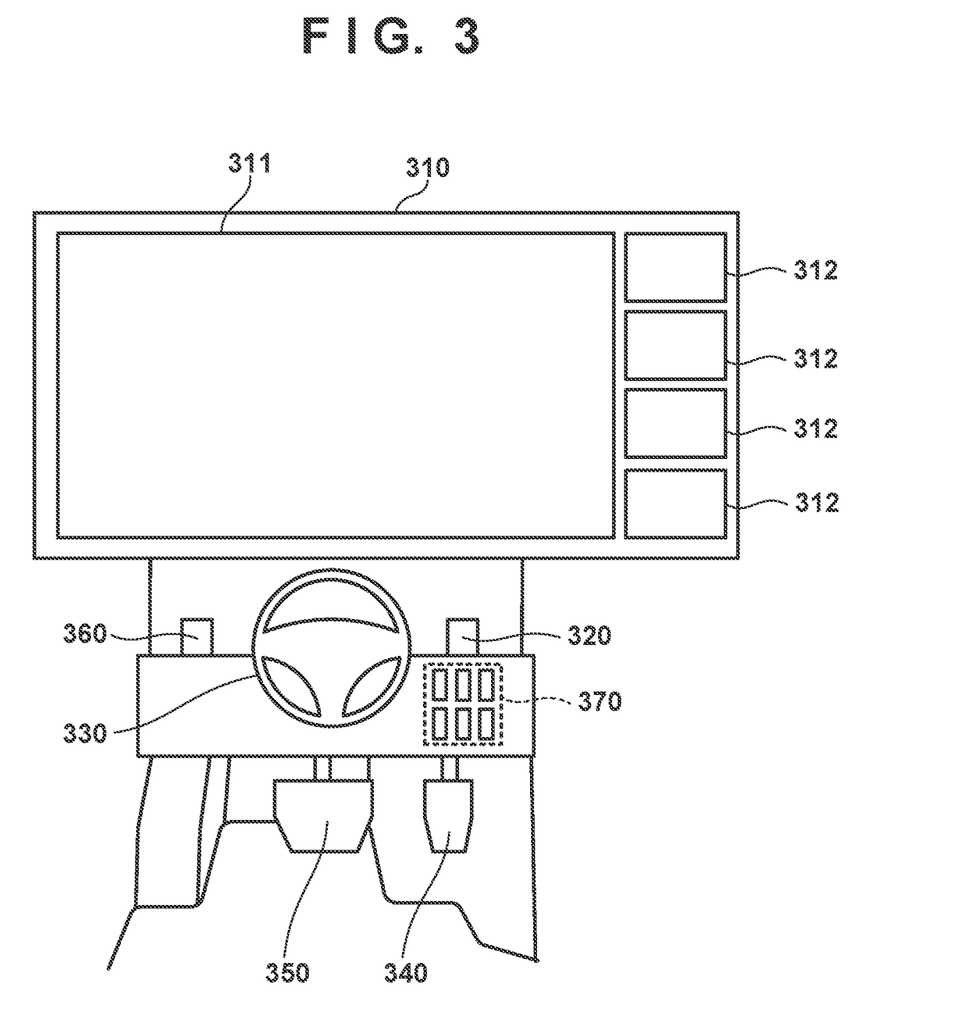
FIG. 3 is a schematic diagram for describing an example of a console for remote driving according to the embodiment.

An example of a configuration of the input unit 203 and the output unit 204 of the remote driving device 200 will be described with reference to the schematic diagram of FIG. 3. In this configuration example, the output unit 204 is implemented by a display device 310 and a sound device 320, and the input unit 203 is implemented by a steering wheel 330, an accelerator pedal 340, a brake pedal 350, a microphone 360, and a plurality of switches 370.

The display device 310 is a device that outputs visual information for providing the remote driving service. The sound device 320 is a device that outputs auditory information for providing the remote driving service. A screen displayed on the display device 310 includes one main region 311 and a plurality of sub regions 312. In the main region 311, information regarding a control target vehicle among a plurality of vehicles to which the remote driving service is provided is displayed. The control target vehicle is a vehicle to which an instruction from the remote driving device 200 is transmitted. In each sub region 312, information regarding a vehicle other than the control target vehicle among the plurality of vehicles to which the remote driving service is provided is displayed. The vehicle other than the control target vehicle may be referred to as a monitoring target vehicle. In a case where the remote driving service is provided to a plurality of vehicles by one remote driving device 200, the operator appropriately switches the vehicle (that is, the control target vehicle) displayed in the main region 311. The information displayed in the main region 311 and the sub region 312 includes a traffic condition around the vehicle, the speed of the vehicle, and the like.

The steering wheel 330 is used to control the steering amount of the control target vehicle in the leading mode. The accelerator pedal 340 is used to control the accelerator pedal position of the control target vehicle in the leading mode. The brake pedal 350 is used to control the brake pedal position of the control target vehicle in the leading mode. The microphone 360 is used to input voice information. The voice information input to the microphone 360 may be transmitted to the control target vehicle and reproduced in the vehicle.

The plurality of switches 370 are used to perform various inputs for providing the remote driving service. For example, the plurality of switches 370 include a switch for switching the control target vehicle, a switch for instructing a determination result of the operator in the assisting mode, a switch for switching a plurality of operation modes, and the like.

The remote driving device 200 described with reference to FIGS. 2 and 3 can provide both the leading mode and the assisting mode. Alternatively, the remote driving device 200 may be capable of providing only one of the leading mode and the support mode. In a case where the leading mode is not provided, the steering wheel 330, the accelerator pedal 340, and the brake pedal 350 can be omitted. In addition, a plurality of remote driving devices 200 may cooperate to provide the remote driving service. In this case, the remote driving device 200 may be able to hand over the vehicle to which the service is provided to another remote driving device 200.

Figure 4:
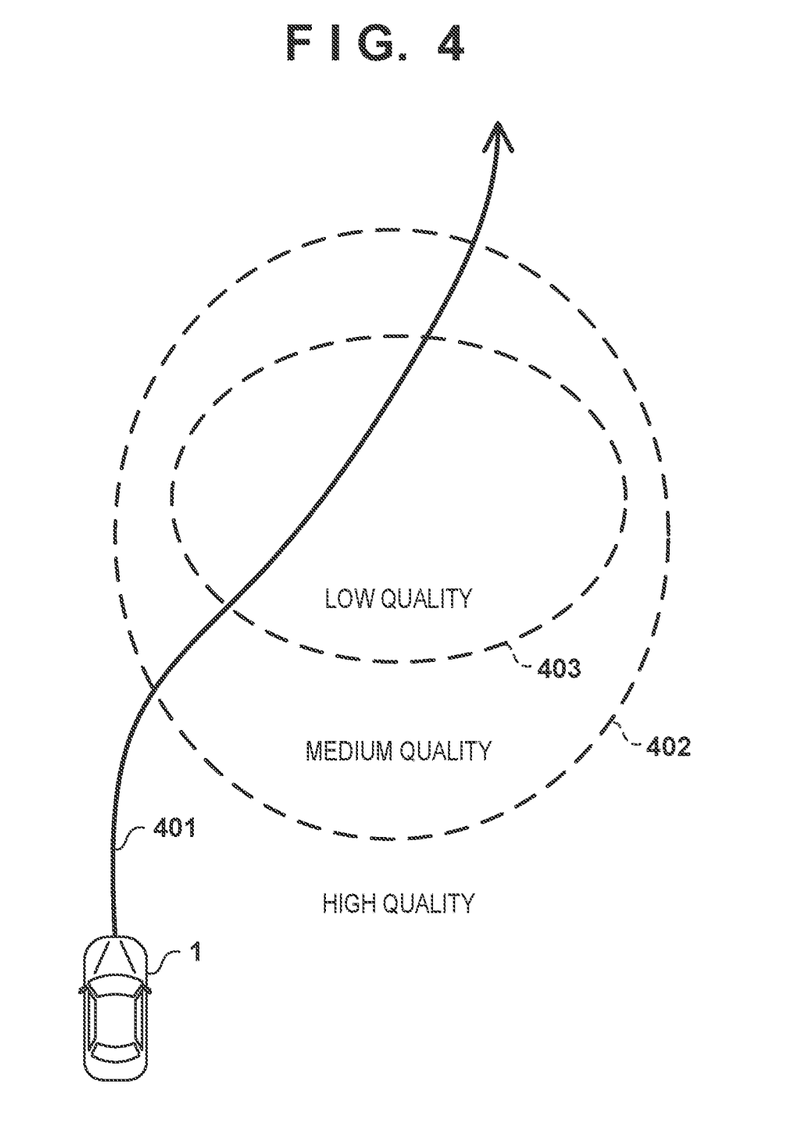
FIG. 4 is a schematic diagram for describing an outline of an operation of the vehicle according to the embodiment.

An outline of some embodiments of the present disclosure will be described with reference to FIG. 4. FIG. 4 illustrates an actual environment in which the vehicle 1 is present. The vehicle 1 travels along a planned route 401 on a road. The planned route 401 is a route on which the vehicle 1 is planned to travel (move). The planned route 401 may be, for example, a route recommended by a navigation device of the vehicle 1 or a route set by the driver of the vehicle 1 or the operator of the remote driving device 200. In a case where a destination is not set, the planned route may be a route along a road in a traveling direction of the vehicle 1.

Each geographic position (hereinafter, simply referred to as a position) of the planned route 401 of the vehicle 1 has various communication qualities. In the embodiment of FIG. 4, the communication quality is classified into three levels, "high quality", "medium quality", and "low quality". The communication quality may be defined by a throughput, may be defined by a delay, or may be defined by a combination thereof. It is assumed that the communication quality is the "high quality" in a region outside a broken line 402 in FIG. 4, the communication quality is the "medium quality" in a region between the broken line 402 and a broken line 403, and the communication quality is the "low quality" in a region inside the broken line 403.

The vehicle 1 can execute various functions in addition to the automated driving function and the remote driving function described above. The functions that can be executed by the vehicle 1 may include, for example, a manual driving function and an in-vehicle infotainment (IVI) function. The manual driving function is a function in which the driver of the vehicle 1 performs traveling by manually controlling acceleration/deceleration and steering. Driving assist functions may be operated in parallel during manual driving. The IVI function is a function of providing entertainment-related data such as music and video in the vehicle. Each of the remote driving function, the automated driving function, the manual driving function, and the IVI function is an example of a function using communication with a device outside the vehicle 1. With the remote driving function, for example, the vehicle 1 transmits data on the vehicle and a target around the vehicle to the remote driving device 200, and receives an operation instruction from the remote driving device 200. With the automated driving function, for example, the vehicle 1 receives data on a target around the vehicle 1 from a device installed in an infrastructure such as a road monitoring camera. The data from the device installed in the infrastructure can also be used for the manual driving function. With the IVI function, data of music and/or video is received from a device that provides a distribution service.

Figure 5:
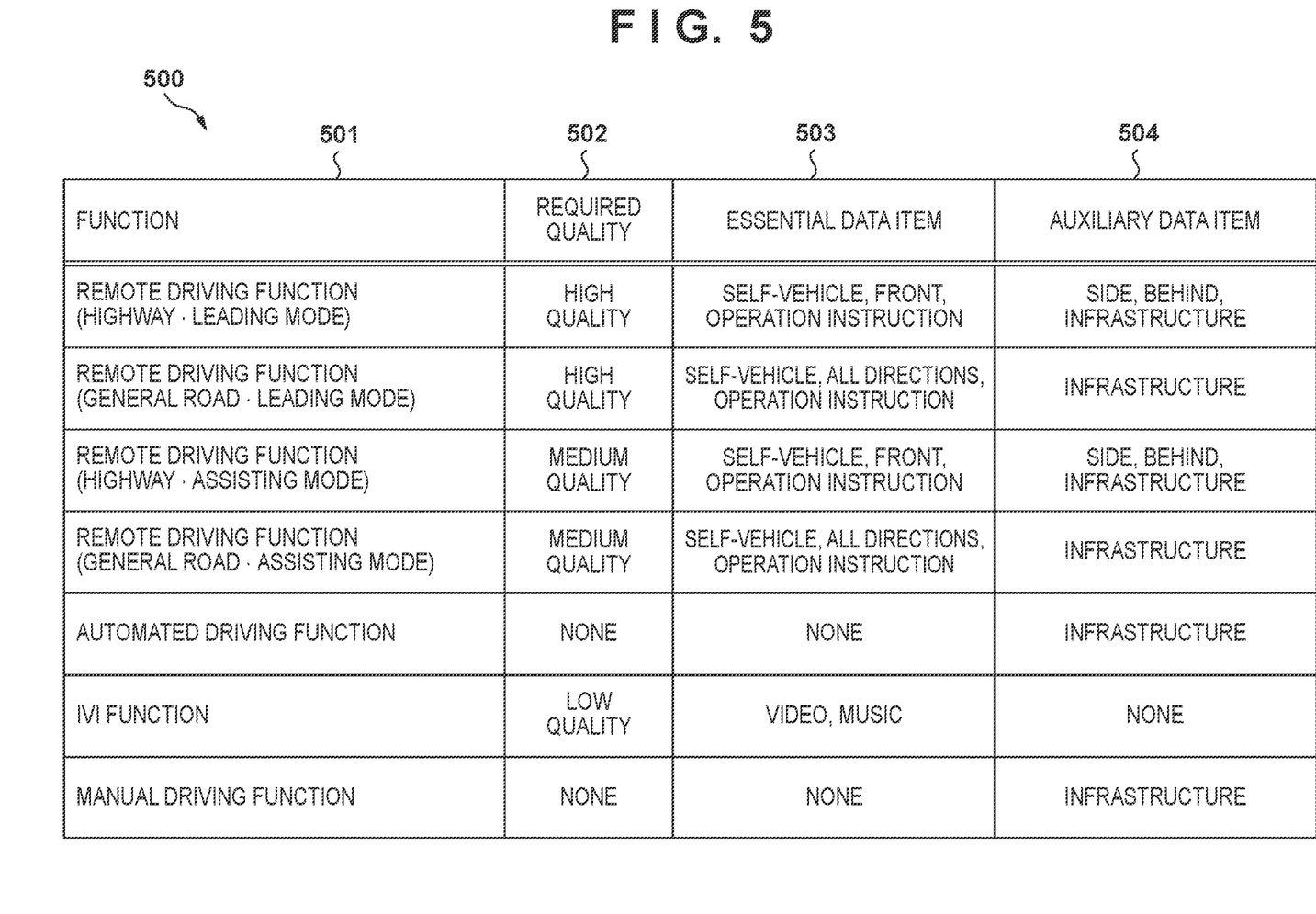
FIG. 5 is a diagram for describing an example of a required quality table according to the embodiment.

In some cases, a function using communication with a device outside the vehicle cannot be satisfactorily operated depending on the quality of communication between this device and the vehicle 1. Therefore, the vehicle 1 restricts the execution of the function in a case where communication quality at a movement destination does not satisfy communication quality required for the execution of the function. The quality required for execution of each function is managed by, for example, a required quality table 500 as illustrated in FIG. 5. The required quality table 500 is created in advance by a driver, an automobile manufacturer, or the like, and is stored in, for example, the memory 20b of the vehicle 1.

The required quality table 500 of FIG. 5 will be described. A column 501 indicates a function using communication. In a case of the remote driving function, the required communication quality and a required data item vary depending on a situation of the planned route of the vehicle 1 and the operation mode. Therefore, each item of the remote operation function is individually specified for each case.

As described above, in the remote driving service in the leading mode, the operator of the remote driving device 200 designates a control amount of the vehicle 1. Therefore, while the remote driving service in the leading mode is used, the control device 2 is operated in the operation mode (referred to as the leading mode of the vehicle 1) in which the traveling control of the vehicle 1 is performed according to the control amount determined by the remote driving device 200. On the other hand, in the remote driving service in the assisting mode, the vehicle 1 determines the control amount of the vehicle 1 according to the route plan designated by the operator of the remote driving device 200. Therefore, while the remote driving service in the assisting mode is used, the control device 2 is operated in the operation mode (referred to as the assisting mode of the vehicle 1) in which the traveling control of the vehicle 1 is performed according to the control amount determined by the control device 2 so as to perform a behavior on which an instruction is given by the remote driving device 200.

The situation of the planned route of the vehicle 1 includes, for example, a type of road, a type of traffic participant, and a congestion degree. Hereinafter, the type of road will be treated as the situation of the planned route. The type of road may include a highway, a general toll road, and a general road. Since the general toll road may be treated in the same manner as the highway, the general road and the highway will be treated as the types of roads in the following. The general road is an example of a road where entry of pedestrians is allowed, and the highway is an example of a road where entry of pedestrians is restricted.

A column 502 indicates the communication quality required for execution of the function. A column 503 indicates a data item necessary for execution of a function among data items used for execution of the function. A column 504 indicates a data item that is not essential (that is, auxiliary) for execution of the function among the data items used for execution of the function.

A case where the remote driving function is executed in the leading mode in a situation where the vehicle 1 is traveling on the highway will be described. The essential data items in a case where the remote driving function is executed in this situation and operation mode are transmission of information on the self-vehicle, transmission of information on a target in front of the self-vehicle, and reception of the operation instruction. In a case where any of these is missing, the vehicle 1 cannot execute the remote driving function. The auxiliary data items in a case where the remote driving function is executed in this situation and operation mode are transmission of information on targets present in an area on the side of the self-vehicle and in an area behind the self-vehicle and reception of data from an infrastructure device. Even in a case where any of these is missing, the vehicle 1 can execute the remote driving function without using these pieces of information. For example, in a case where the information on the targets present in an area on the side of the self-vehicle and in an area behind the self-vehicle is missing, the vehicle 1 accepts only an acceleration/deceleration control from the operator of the remote driving device 200 and performs steering by the automated driving function. In a case where the vehicle 1 executes the remote driving function in the leading mode while traveling on the highway, it is required that the essential data item can be communicated at high communication quality.

A case where the remote driving function is executed in the leading mode in an environment where the vehicle 1 is traveling on the general road will be described. Since there is a possibility that a pedestrian is present unlike in a case of the highway, transmission of the information on the targets present in an area on the side of the self-vehicle and in an area behind the self-vehicle is the essential data item. In a case where the remote operation function is executed in the assisting mode, it is required that the essential data item can be communicated at medium communication quality. In the assisting mode, since traveling can be maintained by the automated driving function, a delay longer than that in the leading mode is allowed for communication between the vehicle 1 and the remote driving device 200. In both the leading mode and the assisting mode, the number of data items essential for executing the remote driving function in a case where the vehicle 1 is on the highway is smaller than the number of data items essential for executing the remote driving function in a case where the vehicle 1 is on the general road (or the general toll road).

In the automated driving function and the manual driving function, since traveling can be maintained without using communication, there is no essential data item, and the required quality is not specified accordingly. In the IVI function, video and music are the essential data items, and even in a case where the delay is long, the required quality is low because the traveling is not affected.

Figure 6:
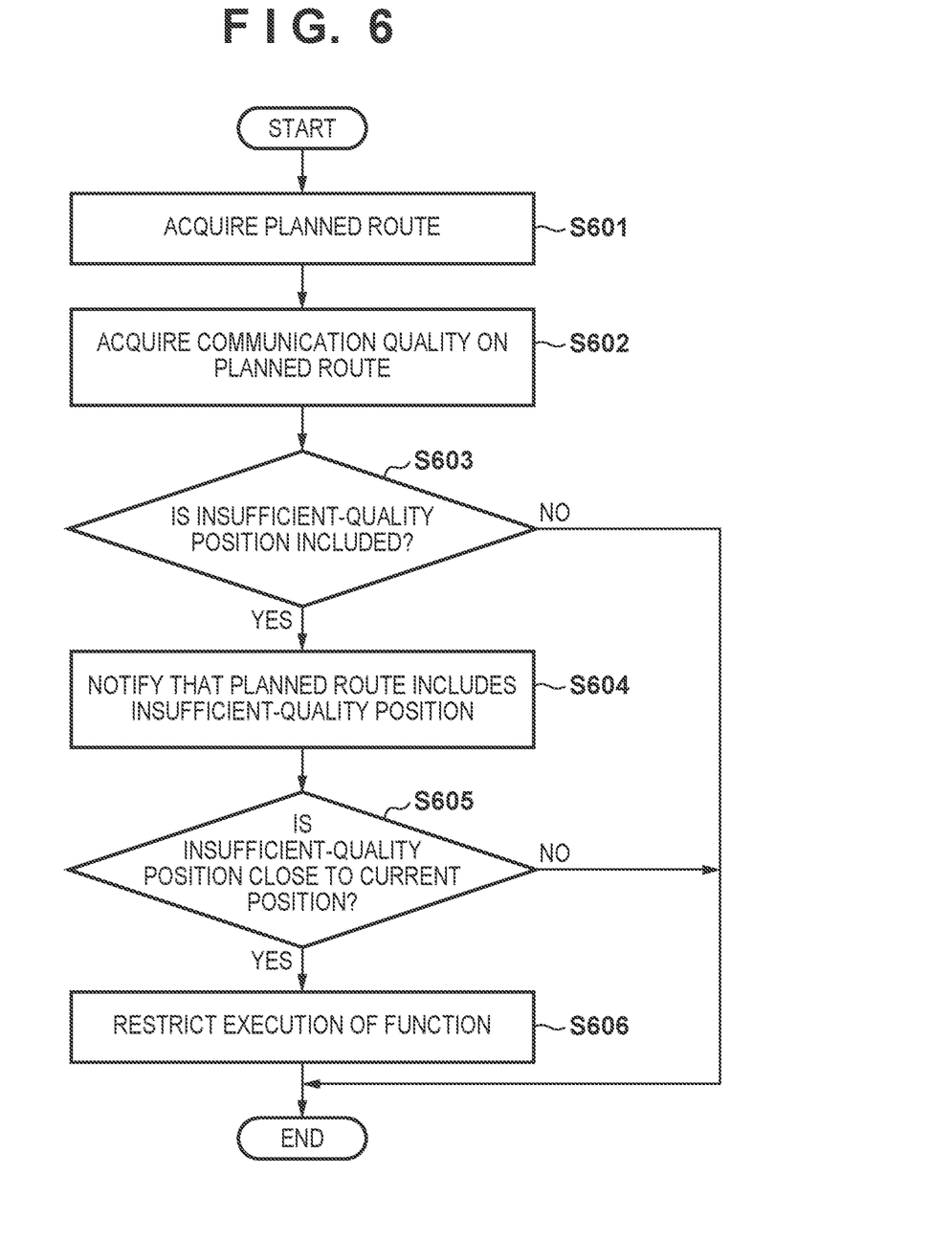
FIG. 6 is a flowchart for describing an example of a control method for the vehicle according to the embodiment.

An example of a control method for the vehicle 1 will be described with reference to FIG. 6. This method may be executed by a processor (for example, the processor 20a) of the vehicle 1 executing a program stored in a memory (for example, the memory 20b). Alternatively, some or all of the steps of the method may be executed by a dedicated circuit such as an application-specific integrated circuit (ASIC). In the former case, the processor is a component for a specific operation, and in the latter case, the dedicated circuit is a component for a specific operation. The control method of FIG. 6 is repeatedly executed during the operation of the vehicle 1.

In step S601, the vehicle 1 acquires a planned route of the vehicle 1. The planned route of the vehicle 1 is as described in FIG. 4. In step S602, the vehicle 1 acquires communication quality at each of a plurality of positions (for example, positions with an interval of 100 m) on the planned route. The communication quality may be communication quality at the time of execution of step S602 or communication quality at an estimated time of arrival of the vehicle 1 at each position. The communication quality may also be quality of communication between the vehicle 1 and a communication partner. In a case where the communication partner is different for each function, the vehicle 1 may acquire communication quality for each communication partner. Alternatively, the vehicle 1 may acquire quality of communication between the vehicle 1 and a serving wireless base station as the communication quality for all the functions. In order to acquire the communication quality, the vehicle 1 may transmit and receive test data to and from the communication partner, or may specify a communication standard (3G, 4G, 5G, or the like) being used by the vehicle 1. In order to acquire the communication quality, the vehicle 1 may inquire of a communication network about the communication quality at each position. The communication network may inquire of a terminal device at each position about the communication quality and respond to the vehicle 1 based on the result.

In step S603, the vehicle 1 determines whether or not the planned route 401 of the vehicle includes a position that does not satisfy the required quality (column 502) specified in the required quality table 500 based on the communication quality acquired in step S602. This determination may be made for each of a plurality of functions (for example, the functions specified in the column 501). In a case where one function is based on the situation of the planned route (in one example, the general road or the highway), the determination may be made for each situation. In a case where one function is based on a plurality of operation modes (in one example, the leading mode or the assisting mode), the determination may be made for each operation mode.

In a case where it is determined that the planned route 401 includes a position that does not satisfy the required quality ("YES" in step S603), the vehicle 1 shifts the processing to step S604, and otherwise ("NO" in step S603), the vehicle 1 ends the processing. Hereinafter, a position that does not satisfy the required quality is referred to as an insufficient-quality position, and a position that satisfies the required quality is referred to as a sufficient-quality position. As described above, the required quality (column 502) is specified for the essential data item (column 503). Therefore, in a case where the essential data item cannot be communicated at the required quality, it is determined that the communication quality required for the execution of the function is not satisfied.

Specifically, the vehicle 1 specifies the required quality (column 502) of each function with reference to the required quality table 500 stored in the memory 20b. The vehicle 1 determines whether or not the required quality is satisfied at each position by comparing the required quality with the communication quality at each position on the planned route 401. In a case where the required quality is satisfied at all the positions, the vehicle 1 determines that the planned route 401 does not include the insufficient-quality position. In a case where the required quality is not satisfied at at least some positions, the vehicle 1 determines that the planned route 401 includes the insufficient-quality position. In this processing, the vehicle 1 can also specify the insufficient-quality position in the planned route 401.

In step S604, the vehicle 1 notifies that the planned route 401 includes the insufficient-quality position. The vehicle 1 may make a notification of the insufficient-quality position. For example, the vehicle 1 may display the insufficient-quality position of the planned route 401 on the map. In the example of the required quality table 500, since the required quality of the remote operation function in the leading mode is the high quality, the required quality is not satisfied inside the broken line 402 in FIG. 4. Therefore, the vehicle 1 notifies that the required quality of the remote driving function in the leading mode is not satisfied in a section inside the broken line 402 in the planned route 401. Alternatively or additionally, the vehicle 1 may notify that the required quality of the remote driving function in the leading mode is satisfied in a section outside the broken line 402 in the planned route 401. The driver of the vehicle 1 may change the planned route 401 based on this notification.

A person who is notified of the fact that the required quality is not satisfied may be the driver of the vehicle 1 or a person related to the function. For example, the vehicle 1 may notify, in addition to or instead of the driver of the vehicle 1, the operator of the remote driving device 200 that the required quality of the remote driving function is not satisfied.

In step S605, the vehicle 1 determines whether or not the insufficient-quality position is close to the current position of the vehicle 1. For example, the vehicle 1 may determine that the insufficient-quality position is close to the current position of the vehicle 1 in a case where a distance between the insufficient-quality position and the current position of the vehicle 1 is equal to or less than a threshold distance, or may determine that the insufficient-quality position is close to the current position of the vehicle 1 in a case where an estimated time of arrival at the insufficient-quality position is equal to or less than a threshold time. In a case where it is determined that the position of the vehicle 1 is close to the insufficient-quality position ("YES" in step S605), the vehicle 1 shifts the processing to step S606, and otherwise ("NO" in step S605), the vehicle 1 ends the processing.

In step S606, the vehicle 1 restricts the execution of the function by the vehicle 1 before the vehicle 1 reaches the insufficient-quality position. When the function is being activated, the vehicle 1 terminates the function, and when the function is not activated, the vehicle 1 cannot activate the function. In a case where the communication quality becomes communication quality high enough to execute the function as time passes or as the vehicle 1 moves, the vehicle 1 can activate the function. The vehicle 1 may activate another function when the function is terminated. For example, when the remote driving function is terminated, the vehicle 1 may continue traveling by activating the automated driving function.

In the above example, in step S606, the execution of the function is restricted before it becomes impossible to execute the function. Alternatively, this step may be omitted. In addition, a notification indicating that the planned route includes the insufficient-quality position is made in step S604. However, this step may be omitted. In the above example, the vehicle 1 executes each step of the control method of FIG. 6. Alternatively, a device (for example, the remote driving device 200 or an external server) outside the vehicle 1 may execute each step of the control method.

Summary of Embodiment

<Configuration 1>

A control device (2 and 200) of a mobile object (1) configured to execute a function using communication, the control device including:

acquisition means (S601) that acquires communication quality on a planned movement route (401) of the mobile object; and determination means (S603) that determines, based on the acquired communication quality, whether or not the planned movement route includes a position that does not satisfy communication quality (502) required for execution of the function.

With this configuration, it is possible to determine whether or not the function can be executed on the planned route on which the mobile object is to move.

<Configuration 2>

The control device according to Configuration 1, further including notification means (S604) that makes a notification of a position in the planned movement route that does not satisfy the communication quality required for the execution of the function.

With this configuration, the position where the function cannot be executed can be known in advance.

<Configuration 3>

The control device according to Configuration 2, further including restriction means (S606) that restricts the execution of the function by the mobile object before the mobile object reaches the position that does not satisfy the communication quality.

With this configuration, the execution of the function can be safely restricted before it becomes impossible to execute the function.

<Configuration 4>

The control device according to any one of Configurations 1 to 3, wherein the mobile object is configured to execute a plurality of functions (501) using communication, and the determination means determines, for each of the plurality of functions, whether or not the planned movement route includes a position that does not satisfy the communication quality.

With this configuration, it is possible to determine whether or not each of the plurality of functions can be executed.

<Configuration 5>

The control device according to any one of Configurations 1 to 4, wherein the function has a plurality of operation modes (501), and the determination means determines, for each of the plurality of operation modes, whether or not the planned movement route includes a position that does not satisfy the communication quality.

With this configuration, it is possible to determine whether or not the function can be executed according to the operation mode.

<Configuration 6>

The control device according to Configuration 5, wherein the plurality of operation modes include a first mode in which a movement control for the mobile object is performed according to a control amount determined by a remote operation device that provides a remote operation service to the mobile object, and a second mode in which the movement control for the mobile object is performed according to a control amount determined by the control device so as to perform a behavior instructed by the remote operation device, and communication quality required in the first mode is higher than communication quality required in the second mode.

With this configuration, it is possible to determine whether or not the function can be executed according to the operation mode for receiving the remote operation service.

<Configuration 7>

The control device according to any one of Configurations 1 to 6, wherein data communicated by the function includes a plurality of data items (503 and 504), and the communication quality required for the execution of the function is based on communication quality required for the data item (503) essential for the execution of the function among the plurality of data items.

With this configuration, there is no need to restrict the execution of the function more than necessary.

<Configuration 8>

The control device according to Configuration 7, wherein the determination means determines that the communication quality required for the execution of the function is not satisfied in a case where the essential data item is not communicable at predetermined communication quality.

With this configuration, there is no need to restrict the execution of the function more than necessary.

<Configuration 9>

The control device according to any one of Configurations 1 to 8, wherein the communication quality required for the execution of the function is based on a type (501) of road of the planned movement route.

With this configuration, it is possible to determine whether or not the function can be executed according to the type of road of the planned route.

<Configuration 10>

The control device according to Configuration 9, wherein the type of road includes a highway, a general toll road, and a general road, and the number of data items essential for the execution of the function in a case where the mobile object is on the highway or the general toll road is smaller than the number of data items essential for the execution of the function in a case where the mobile object is on the general road.

With this configuration, it is possible to determine whether or not the function can be executed according to the type of road of the planned route, that is, the highway, the general toll road, or the general road.

<Configuration 11>

A program for causing a computer to function as each means of the control device according to any one of Configurations 1 to 10.

With this configuration, the above configurations can be implemented in a form of a program.

<Configuration 12>

A method of controlling a mobile object (1) configured to execute a function using communication, the method including:

an acquisition step (S601) of acquiring communication quality on a planned movement route (401) of the mobile object; and a determination step (S603) of determining, based on the acquired communication quality, whether or not the planned movement route includes a position that does not satisfy communication quality (502) required for execution of the function.

With this configuration, it is possible to determine whether or not the function can be executed on the planned route on which the mobile object is to move.

The present invention is not limited to the above-described embodiment, and various changes and modifications can be made without departing from the spirit and scope of the present invention. Therefore, in order to make the scope of the present invention public, the following claims are attached.

What is claimed is:

1. A control device of a mobile object configured to execute a remote driving function using communication, the control device comprising at least one processor circuit with a memory comprising instructions, that when executed by the processor circuit, cause the processor circuit to at least:
acquire communication quality on a planned movement route of the mobile object; and
determine, for each of a plurality of operation modes of the function, based on the acquired communication quality, whether or not the planned movement route includes a position that does not satisfy communication quality required for execution of the function,
wherein the plurality of operation modes include a first mode in which a movement control for the mobile object is performed according to a control amount determined by a remote operation device that provides a remote operation service to the mobile object, and a second mode in which the movement control for the mobile object is performed according to a control amount determined by the control device so as to perform a behavior instructed by the remote operation device,
communication quality required in the first mode is higher than communication quality required in the second mode, and
the mobile object is controlled to follow the planned movement route based on a control input from the control device.

2. The control device according to claim 1, wherein the instructions further cause the processor circuit to make a notification of a position in the planned movement route that does not satisfy the communication quality required for the execution of the function.

3. The control device according to claim 2, wherein the instructions further cause the processor circuit to restrict the execution of the function by the mobile object before the mobile object reaches the position that does not satisfy the communication quality.

4. The control device according to claim 1,
wherein the mobile object is configured to execute a plurality of functions using communication, and
wherein the instructions further cause the processor circuit to determine, for each of the plurality of functions, whether or not the planned movement route includes a position that does not satisfy the communication quality.

5. A control device of a mobile object configured to execute a remote driving function using communication, the control device comprising at least one processor circuit with a memory comprising instructions, that when executed by the processor circuit, cause the processor circuit to at least:
acquire communication quality on a planned movement route of the mobile object; and
determine, based on the acquired communication quality, whether or not the planned movement route includes a position that does not satisfy communication quality required for execution of the function,
wherein the communication quality required for the execution of the function is based on a type of road of the planned movement route,
the type of road including a highway, a general toll road, and a general road,
the number of data items essential for the execution of the function in a case where the mobile object is on the highway or the general toll road is smaller than the number of data items essential for the execution of the function in a case where the mobile object is on the general road, and
the mobile object is controlled to follow the planned movement route based on a control input from the control device.

* * * * *